United States Patent
Cho

(10) Patent No.: US 7,974,631 B2
(45) Date of Patent: Jul. 5, 2011

(54) METHOD AND SYSTEM FOR RESOURCE ALLOCATION BASED ON DISTRIBUTED SCHEDULING IN A WIRELESS COMMUNICATION SYSTEM INCLUDING HETEROGENEOUS MOBILE STATIONS

(75) Inventor: Sung-Woo Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 608 days.

(21) Appl. No.: 11/714,651

(22) Filed: Mar. 6, 2007

(65) Prior Publication Data

US 2007/0218916 A1    Sep. 20, 2007

(30) Foreign Application Priority Data

Mar. 6, 2006  (KR) .................. 10-2006-0021125

(51) Int. Cl.
  *H04W 72/00*    (2009.01)

(52) U.S. Cl. .................... 455/453; 455/452.1; 455/450; 370/341; 370/329

(58) Field of Classification Search .......... 455/450–453, 455/436, 437; 370/468, 341, 437, 333, 329, 370/337, 343, 344
See application file for complete search history.

(56) References Cited

U.S. PATENT DOCUMENTS

| | | | |
|---|---|---|---|
| 6,366,945 B1* | 4/2002 | Fong et al. ............... | 718/104 |
| 6,535,742 B1* | 3/2003 | Jiang et al. .............. | 455/452.2 |
| 6,693,892 B1* | 2/2004 | Rinne et al. ............. | 370/348 |
| 7,016,317 B1* | 3/2006 | Pathak et al. ........... | 370/329 |
| 7,359,349 B2* | 4/2008 | Kayama et al. .......... | 370/329 |
| 7,522,924 B2* | 4/2009 | Abeta et al. ............. | 455/452.2 |
| 2006/0026004 A1* | 2/2006 | Van Nieuwenhuizen ...... | 705/1 |
| 2006/0246935 A1* | 11/2006 | Iochi et al. ............. | 455/522 |

OTHER PUBLICATIONS

Kelly et al., Rate Control for Communication Networks: Shadow Prices, Proportional Fairness and Stability, 1988.

* cited by examiner

*Primary Examiner* — Rafael Pérez-Gutiérrez
*Assistant Examiner* — Marisol Fahnert
(74) *Attorney, Agent, or Firm* — NSIP Law

(57) ABSTRACT

A method and system for efficient resource allocation based on distributed scheduling in a wireless communication system including heterogeneous mobile stations. The method includes receiving, by a base station, a first message including resource request quantity information from at least one heterogeneous mobile station using different resource allocation schemes; calculating, by the base station, a shadow price for a corresponding mobile station based on the resource request quantity information associated with the corresponding mobile station; and transmitting a second message including resource allocation quantity information determined based on the shadow price to the corresponding mobile station.

13 Claims, 4 Drawing Sheets

METHOD AND SYSTEM FOR RESOURCE ALLOCATION BASED ON DISTRIBUTED SCHEDULING IN A WIRELESS COMMUNICATION SYSTEM INCLUDING HETEROGENEOUS MOBILE STATIONS

PRIORITY

This application claims the benefit under 35 U.S.C. §119 (a) of an application filed in the Korean Industrial Property Office on Mar. 6, 2006 and assigned Ser. No. 2006-21125, the contents of which are incorporated herein by reference.

BACKGROUND OF THE INVENTION

1. Field of the Invention

The present invention generally relates to a method and a system for improving performance of a mobile station in a wireless communication system, and more particularly to a method and a system for resource allocation in a wireless communication system including heterogeneous mobile stations using different resource allocation schemes.

2. Description of the Related Art

With rapid development of mobile communication technology, various communication systems providing high speed packet data services have been proposed. In design and control of communication systems, a main issue being focused on is optimization technology for effectively improving performance of the system. Therefore, recent mobile communication technologies have presented mathematical models for optimization of communication systems. Especially, various transmission control technologies have been proposed in order to effectively control resources which a base station allocates to mobile stations within an available bandwidth in a communication system.

In conventional transmission control technologies, optimization models for efficient resource allocation reflect ways of dealing with contentious traffic within a limited bandwidth regarding stability and fairness. Stability is an engineering field issue, which relates to randomness and feedback transmission, and fairness is an economic issue, which relates to utility. As networks gradually evolve to have intelligence, the difference between stability and fairness is gradually decreasing.

A conventional resource allocation method will now be described with an example of the data rate, which is a resource allocated to a mobile station by a base station.

As an example of the conventional technology of allocating resources to a mobile station by using a specific utility function, there is a treatise released in 1988, entitled "Rate Control For Communication Networks: Shadow Prices, Proportional Fairness And Stability (FP Kelly, University of Cambridge, UK)." Kelly's treatise (Kelly) proposed a distributed processing method that optimizes a specific utility function in order to maximize average fairness and throughput for each time unit during allocation of resources to the mobile station.

In Kelly, target formulas of the specific utility function are defined by Equations (1) and (2) below, and the distributed processing method is defined by Equation (3) below.

$$\text{MAX} \sum_i U_i(x_i) \quad (1)$$

$$Ax \leq c \quad (2)$$

In Equation (1), U(x) denotes a utility function, x denotes a data rate (i.e. resource) allocated to a mobile station, and i denotes a parameter for identifying a mobile station (user). In Equation (2), A refers to a matrix indicating mobile stations, and c refers to the capacity of all resources that can be allocated by a base station. By using Equations (1) and (2), it is possible to allocate the data rate x to each mobile station to obtain a maximum utility function within the limited capacity c of the entire resources.

Further, Kelly has presented a shadow price defined by Equation (3) below, which is a parameter showing a change in Equation (1) when a condition such as the resource allocation cost is provided to Equation (1).

$$\mu_j(t) = P_j \left( \sum_{S: j \in S} x_s(t) \right) \quad (3)$$

In Equation (3), $x_s$ refers to a data rate when the shadow price is applied, j denotes a parameter for identifying a base station, $P_j$ denotes cost applied by the base station j when allocating a data rate, and $\mu_j$ refers to a shadow price when the base station j allocates a data rate.

Further, a data rate $x_r(t)$ allocated to a mobile station r when the shadow price as defined by Equation (3) is applied is defined by Equation (4) below.

$$\frac{d}{dt} x_r(t) = K \left( W_r - x_r(t) \sum_{j \in r} \mu_j(t) \right) \quad (4)$$

In Equation (4), parameter r is used with the same purpose as that of i for identifying a mobile terminal in the target Equation (1), W refers to the price charged to a corresponding mobile station r for use of a packet data service during unit time, and K denotes a constant. Equation (4) can provide proportional fairness in transmission control technology of an Additive Increase Multiplicative Decrease (AIMD) scheme, in which a bandwidth is multiplicatively reduced in a congestion status and is additively increased in a non-congestion status in a network using a specific utility function.

An example of communication systems for allocating a data rate to a mobile station is the 1x Evolution Data Only (EV-DO) proposed by 3GPP2, which is one of standard organizations. When the 1x EV-DO system controls the forward data rate, the mobile station measures a reception intensity of a pilot channel transmitted by the base station, and transmits a message including Data Rate Control (DRC) information used by the mobile station to the base station based on the measured reception intensity of the pilot channel signal. Then, the base station receives the DRC information from mobile stations and performs resource allocation in order to transmit packet data to only mobile stations in a good channel condition with a data rate reported by the corresponding mobile station.

Therefore, in the 1x EV-DO system, multiple mobile stations transmit DRC information in the same way, and the base station allocates a reported data rate to only the mobile stations in a good channel condition from among the mobile stations that transmitted DRC information. That is, the base station applies a specific utility function. Therefore, it is noted that the 1x system shows the AIMD characteristic, as shown in FIGS. 1 and 2.

The conventional technology as described above is proper for resource allocation in a wireless communication environment applying a common specific utility function to all mobile stations communicating with a base station. However, the conventional technology is improper for a wireless communication environment including heterogeneous mobile stations using different protocols for resource allocation. Therefore, a need exists for a resource allocation method for the future wireless communication environment which applies an unspecified utility function for allocation of resources to heterogeneous mobile stations.

SUMMARY OF THE INVENTION

Accordingly, the present invention has been made to solve the above-mentioned problems occurring in the prior art, and the present invention provides a method and system for efficient resource allocation based on distributed scheduling in a wireless communication system including heterogeneous mobile stations.

In accordance with an aspect of the present invention, there is provided a method for resource allocation in a wireless communication system, the method including receiving, by a base station, a first message including resource request quantity information from at least one heterogeneous mobile station using different resource allocation schemes; calculating, by the base station, a shadow price for a corresponding mobile station based on the resource request quantity information associated with the corresponding mobile station; and transmitting a second message including resource allocation quantity information determined based on the shadow price to the corresponding mobile station.

In accordance with another aspect of the present invention, there is provided a wireless communication system including a plurality of mobile stations using different resource allocation schemes, each of the mobile stations transmitting a first message including desired resource request quantity information to a base station; and the base station for calculating a shadow price for each mobile station based on the resource request quantity information associated with each mobile station, and transmitting a second message including resource allocation quantity information determined based on the shadow price to the mobile stations.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description, a detailed description of known functions and configurations incorporated herein will be omitted when it may make the subject matter of the present invention rather unclear.

Figure 1:
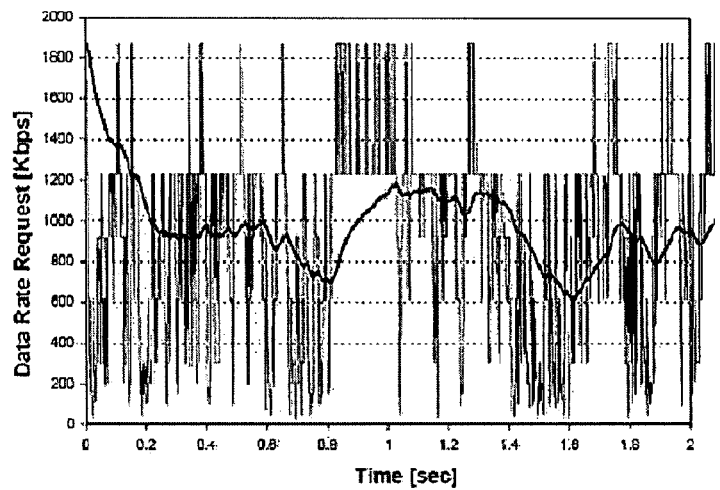
FIGS. 1 and 2 are waveform diagrams illustrating AIMD characteristics of a wireless communication system using a particular utility function for resource allocation.
Figure 2:
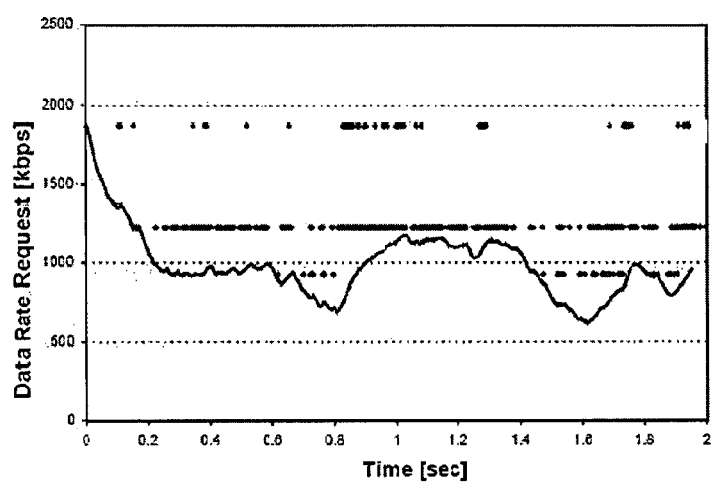
Figure 3:
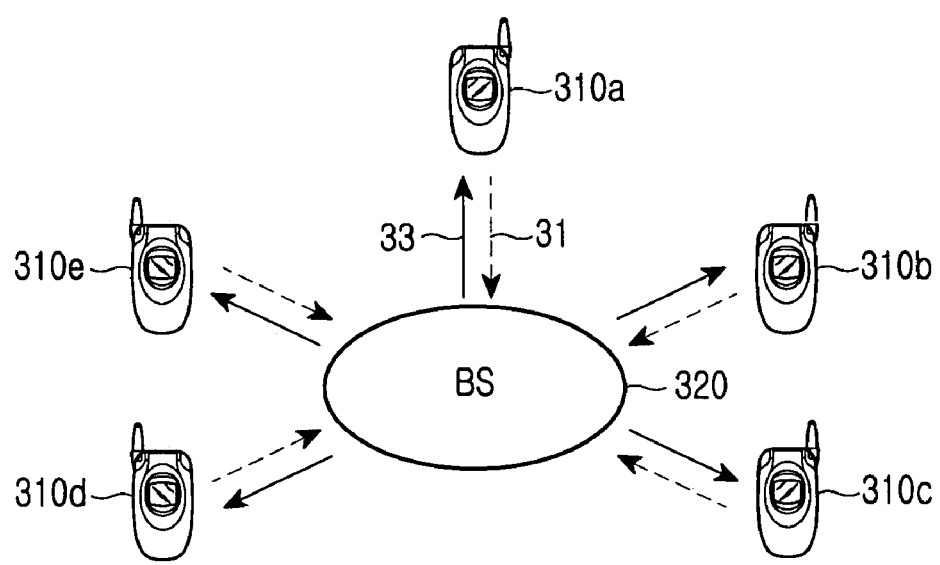
FIG. 3 is a block diagram illustrating a brief structure of a wireless communication system according to the present invention.

FIG. 3 shows a wireless communication system according to the present invention. FIG. 3 is based on an assumption that a plurality of Mobile Stations (MSs) 310a to 310e are allocated data rates by using different unspecified utility functions from a Base Station (BS) 320. According to the kind of the applied system, each of the MSs 310a 310e may also be called an Access Terminal (AT) or a Mobile Terminal (MT), and the BS 320 may also be called an Access Network (AN) or an Access Point (AP).

In FIG. 3, the MSs 310a to 310e are allocated resources, such as data rates, from the BS 320 by using different utility functions. In this regard, a treatise released on 2002 by Ahish Goel, entitled "Simultaneous Optimization For Unspecified Utility Function (University of Stanford)," proposed a technology for optimizing resource allocation in a wireless communication system, such as the wireless communication system shown in FIG. 3. However, in the system shown in FIG. 3, because the MSs 310a to 310e and the BS 320 follow given protocols according to unspecified utility functions, a complicated resource allocation process is necessary, and optimization becomes difficult. Further, in the optimization technology proposed by Ahish Goel, dynamic resource allocation is difficult when either the number of MSs communicating with a BS changes or the topology of the network changes.

Therefore, the present invention presents a utility function generalized in a wireless system, as shown in FIG. 3, and provides a scheme which imposes a price for use of resources to each MS, so selfish MSs by themselves control the quantity of resources they use and thus can reach an optimum resource allocation status from a stable equilibrium status.

Figure 4:
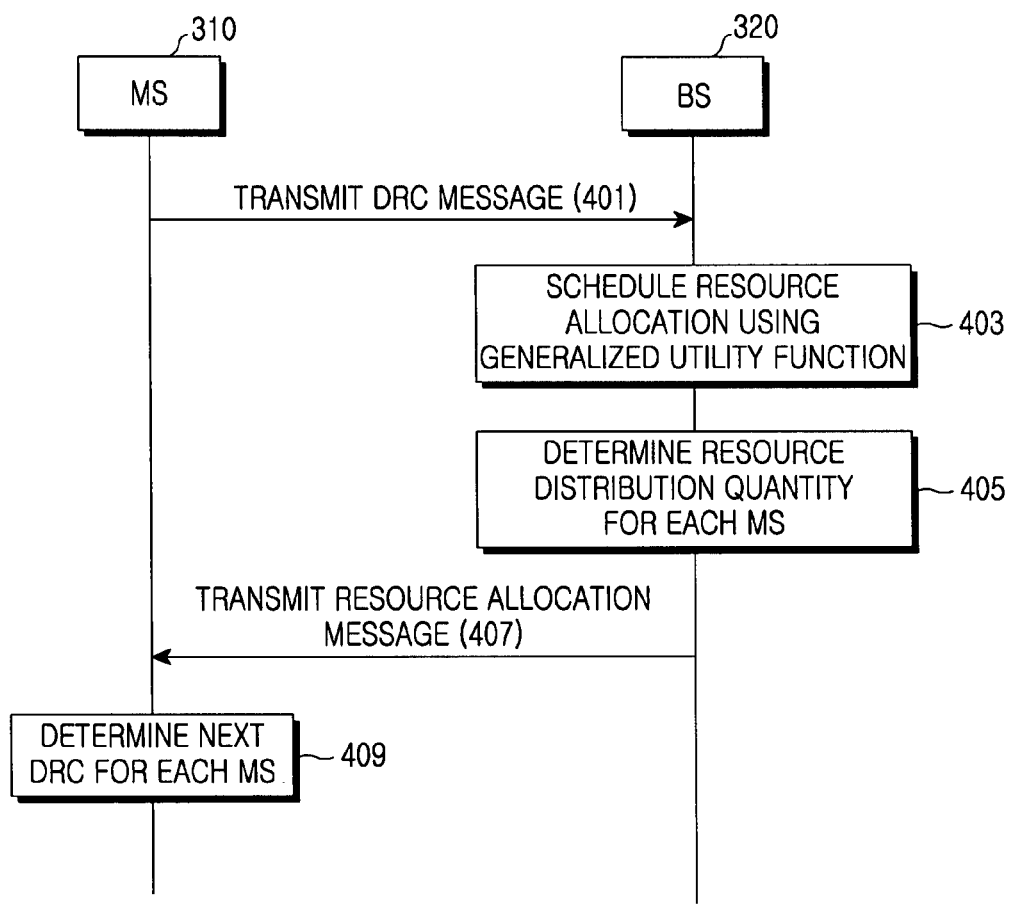
FIG. 4 is a flow diagram illustrating a method for resource allocation in a wireless communication system according to the present invention.
Figure 5:
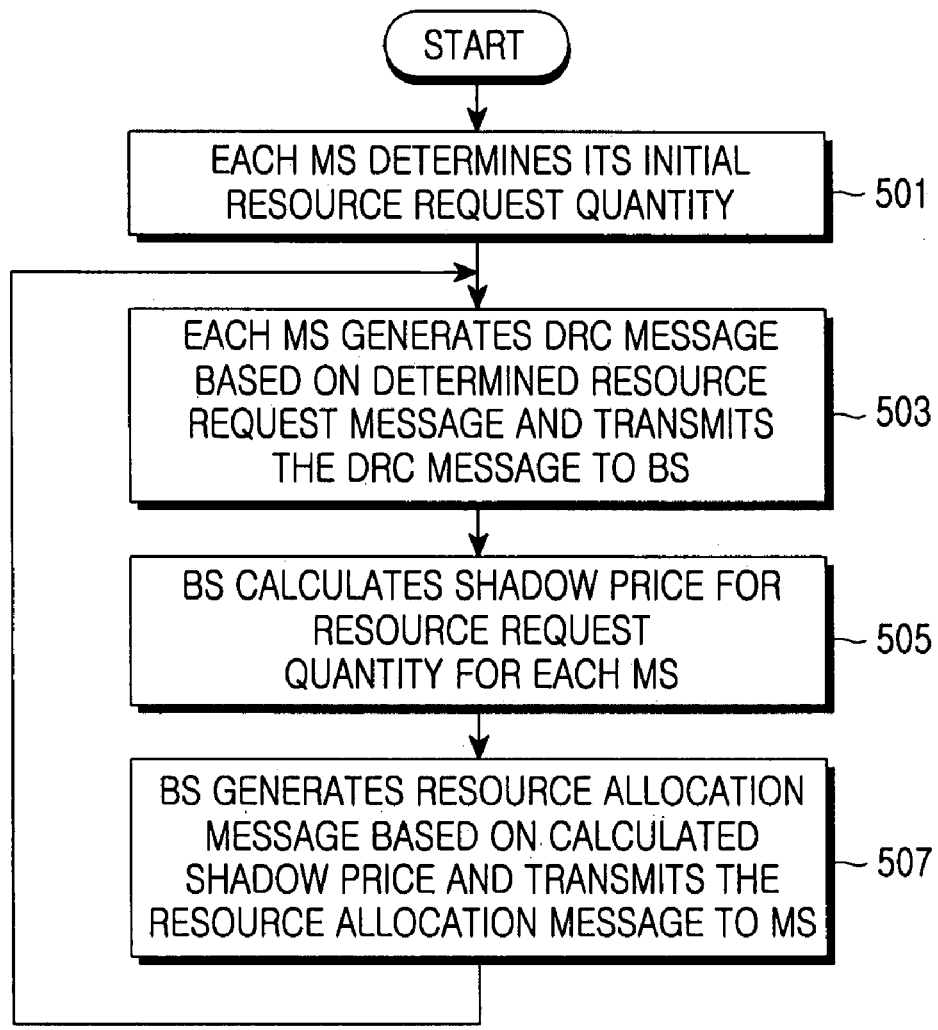
FIG. 5 is a flow diagram illustrating a method for resource allocation based on a shadow price for each mobile station in a wireless communication system according to the present invention.

FIGS. 4 and 5 will now be described based on an assumption that the data rate is a resource allocated to an MS.

FIG. 4 shows a method for resource allocation in a wireless communication system according to the present invention.

In step 401, each MS 310 transmits a Data Rate Control (DRC) message 31, as shown in FIG. 3, including data rate information of the MS 310 to the BS 320. Then, in step 403, the BS 320 having received the DRC message(s) schedules resource allocation for a corresponding data rate by using a generalized utility function provided by the present invention for each of the MSs 310 that transmitted the DRC message. In step 405, the BS 320 determines the quantity of allocated resources for each MS 310. In step 407, the BS 320 generates and transmits a resource allocation message 33, as shown in FIG. 3, for each MS 310 according to the determined quantity of allocated resources. Then, in step 409, the MSs 310 determine a data rate for the next transmission based on the quantity of current allocated resources. Further, in step 403, the generalized utility function according to the present invention is determined based on a shadow price for each MS 310, which will be described with reference to FIG. 5.

FIG. 5 shows a method for resource allocation based on a shadow price for each mobile station in a wireless communication system according to the present invention.

In step 501 of FIG. 5, each MS 310 determines a desired initial data rate. Then, in step 503, each MS 310 transmits a DRC message including data rate information used by itself to the BS 320. The desired initial data rate may be determined as, for example, ½ of the minimum data rate that can be supported by the BS 320. Then, in step 505, the BS 320 having received the DRC message from the MSs 310 schedules resource allocation for the data rate by calculating the shadow price $l_{i,j}$ defined by Equation (5) below.

$$\text{shadow price} = l_{i,j} = \exp\left(\frac{\delta \times L_j}{x_i}\right) \quad (5)$$

In Equation (5), i denotes an index for identifying a mobile station, j denotes an index for identifying a base station, $L_j$ denotes a price for use of resources for the mobile station i, and $x_i$ denotes a current data rate of the mobile station i. It is noted that the shadow price can be calculated by using only local information, such as the data rate of the mobile station and a load currently imposed on the base station.

In Equation (5), δ has a value of 12 ln ρ+2 (δ=12 ln ρ+2), wherein ρ is determined to have a value of max {a number of mobile stations that can be controlled by a base station, a ratio of a minimum data rate to a maximum data rate supportable by a base station}. Max{ } refers to an operator for selecting a maximum value between two values. The load imposed on the base station is defined as, for example, $l_e * \exp\{\delta * L_e\}$, wherein e indicates a natural log exponent, $L_e$ refers to a sum of data rates supported by a current base station, and $l_e$ may have a value of $\delta/(2\rho)^3$.

After calculating the shadow price $l_{i,j}$ for each MS 310 in step 505, the BS 320 determines the quantity of allocated resources, that is, a new data rate $x_{i(new)}$, for each MS 310 by Equation (6) below in step 507.

$$x_{i(new)} = x_{i(current)} \times \log\left(\frac{1}{l_{i,j}}\right) \times \frac{1}{RTT} \quad (6)$$

In Equation (6), RTT refers to round trip time.

Further, the BS 320 transmits a resource allocation message including information of the data rate determined by Equation (6) to each corresponding MS 310. After step 507, the MS 310 proceeds to step 503 in which the MS 310 confirms the data rate determined as the current resource allocation quantity from the received resource allocation message and determines a data rate for the next transmission based on the confirmed data rate.

Meanwhile, if the data rate $x_i$ for each MS 310 defined by Equation (6) is differentiated, it is noted that the data rate $x_i$ for each MS 310 changes according to the shadow price of the present invention, as noted from Equation (7).

$$\frac{dx_i}{dt} = \frac{1}{RTT}\log\left(\frac{1}{l_{i,j}}\right) \quad (7)$$

Equation (7) implies that a mobile station of the present invention operates in a manner of Multiplicative Increase Multiplicative Decrease (MIMD) in contrast to the Additive Increase Multiplicative Decrease (AIMD) manner of conventional transmission control technology. Therefore, according to the present invention, dynamic resource allocation is possible even in a wireless communication system in which a plurality of mobile stations are allocated data rates from a base station by using unspecified utility function.

In view of the relation between Equation (7) and the MIMD, the MIMD refers to a transmission control scheme in which the data rate $x_i$ multiplicatively increases and decreases. That is, when the shadow price $l_{i,j}$ is fixed, a value obtained by differentiating the data rate $x_i$ with respect to time is fixed, and thus the data rate $x_i$ multiplicatively increases/decreases.

As described above, in the conventional resource allocation method, either each mobile station exactly identifies its own utility function and transmits it to the base station, or the base station estimates an approximate utility function of each mobile station. However, according to the present invention, each mobile station is given an unspecified utility function, which can be generalized by the shadow price provided by the present invention.

That is, in the present invention, each mobile station is given a shadow price for use of resources, so a mobile station can control the quantity of used resources by itself. Therefore, the present invention provides a resource allocation scheme applicable to the future wireless communication environment and can achieve resource allocation capable of satisfying a target formula, such as Equation (1). Accordingly, the present invention provides a basis on which current 3G-based resource allocation schemes can be smoothly evolved to combine various heterogeneous mobile communication systems into one network.

Further, according to the present invention, it is possible to achieve resource allocation capable of satisfying the target formula without separate communication between heterogeneous base stations. It is because, only by distributing exact shadow prices to mobile stations without exchange of information about resource allocation statuses between the base stations, each mobile station can intelligently determine its own resource allocation quantity. Therefore, according to the present invention, separate communication between heterogeneous base stations is unnecessary.

According to the present invention as described above, in a wireless communication system including heterogeneous mobile stations having different resource use criteria, the selfish mobile stations can reach an optimum resource allocation status in a stable equilibrium status by applying a mobile station-leading distributed scheduling scheme using a shadow price for resource allocation.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for resource allocation in a wireless communication system, the method comprising:
   receiving, by a base station, a first message including resource request quantity information from at least one heterogeneous mobile station using different resource allocation schemes;
   calculating, by the base station, a shadow price for a corresponding mobile station based on the resource request quantity information associated with the corresponding mobile station and a load currently imposed on the base station;
   determining, by the base station, resource allocation quantity information based on the shadow price to the corresponding mobile station; and
   transmitting, by the base station, a second message including the resource allocation quantity information.

2. The method as claimed in claim 1, wherein the resource allocation quantity information includes a data rate allocated to each mobile station.

3. The method as claimed in claim 2, wherein the shadow price is defined by $$\text{shadowprice} = l_{i,j} = \exp\left(\frac{\delta \times L_j}{x_i}\right),$$

wherein i denotes an index for identifying a mobile station, j denotes an index for identifying the base station, L, denotes a price for use of resources for a mobile station i, $x_i$ denotes a data rate of the mobile station i, δ has a value determined using one of a number of mobile stations that can be controlled by the base station and a ratio of a minimum data rate to a maximum data rate supportable by the base station.

4. The method as claimed in claim 3, wherein the quantity of resources is defined by $$x_{i(new)} = x_{i(current)} \times \log\left(\frac{1}{l_{i,j}}\right) \times \frac{1}{RTT},$$

wherein RTT refers to round trip time lapsed during data transmission between the mobile station and the base station.

5. The method as claimed in claim 1, further comprising determining a quantity of resources for a next transmission based on the resource allocation quantity information by the corresponding mobile station having received the second message.

6. The method as claimed in claim 1, wherein the shadow price is fixedly determined for each mobile station.

7. A wireless communication system comprising:
a plurality of mobile stations using different resource allocation schemes, each of the mobile stations transmitting a first message including desired resource request quantity information to a base station; and
the base station for calculating a shadow price for each mobile station based on the resource request quantity information associated with each mobile station and a load currently imposed on the base station, determining resource allocation quantity information based on the shadow price to the corresponding mobile station, and transmitting a second message including the resource allocation quantity information.

8. The wireless communication system as claimed in claim 7, wherein the resource request quantity information includes a data rate allocated to each mobile station.

9. The wireless communication system as claimed in claim 8, wherein the shadow price is defined by $$\text{shadowprice} = l_{i,j} = \exp\left(\frac{\delta \times L_j}{x_i}\right),$$

wherein i denotes an index for identifying a mobile station, j denotes an index for identifying the base station, $L_j$ denotes a price for use of resources for the mobile station i, $x_i$ denotes a data rate of the mobile station i, δ has a value determined using one of a number of mobile stations that can be controlled by the base station and a ratio of a minimum data rate to a maximum data rate supportable by the base station.

10. The wireless communication system as claimed in claim 9, wherein the quantity of resources is defined by $$x_{i(new)} = x_{i(current)} \times \log\left(\frac{1}{l_{i,j}}\right) \times \frac{1}{RTT},$$

wherein RTT refers to round trip time lapsed during data transmission between the mobile station and the base station.

11. The wireless communication system as claimed in claim 7, wherein the mobile station having received the second message determines a quantity of resources for a next transmission based on the resource request quantity information.

12. The wireless communication system as claimed in claim 7, wherein the shadow price is fixedly determined for each mobile station.

13. A method for resource allocation in a wireless communication system, the method comprising:
transmitting, by at least one heterogeneous mobile station, a first message including resource request quantity information to a base station; and
receiving a second message at the at least one heterogeneous mobile station, the second message including resource allocation quantity information determined based on a shadow price calculated at the base station based on the resource request quantity information associated with the mobile station and a load currently imposed on the base station.

* * * * *